US012153369B1

(12) United States Patent
Nakatsuka

(10) Patent No.: US 12,153,369 B1
(45) Date of Patent: Nov. 26, 2024

(54) IMAGE FORMING APPARATUS

(71) Applicant: TOSHIBA TEC KABUSHIKI KAISHA, Tokyo (JP)

(72) Inventor: Yohsei Nakatsuka, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/465,198

(22) Filed: Sep. 12, 2023

(51) Int. Cl.
*G03G 15/00* (2006.01)
*G03G 15/08* (2006.01)
*G03G 15/10* (2006.01)

(52) U.S. Cl.
CPC ....... *G03G 15/556* (2013.01); *G03G 15/0849* (2013.01); *G03G 15/0851* (2013.01); *G03G 15/0853* (2013.01); *G03G 15/0855* (2013.01); *G03G 15/105* (2013.01); *G03G 15/5008* (2013.01); *G03G 15/5033* (2013.01); *G03G 15/5041* (2013.01); *G03G 15/55* (2013.01); *G03G 2215/0888* (2013.01)

(58) Field of Classification Search
CPC ........... G03G 15/0849; G03G 15/0851; G03G 15/0853; G03G 15/0855; G03G 15/105; G03G 15/5008; G03G 15/5033; G03G 15/5041; G03G 15/55; G03G 15/556; G03G 2215/0888
See application file for complete search history.

(56) References Cited

U.S. PATENT DOCUMENTS

| | | | | |
|---|---|---|---|---|
| 9,086,648 | B1 * | 7/2015 | Conrow | G03G 15/0855 |
| 2002/0044783 | A1 * | 4/2002 | Eck | G03G 15/553 399/10 |
| 2021/0373457 | A1 * | 12/2021 | Park | G03G 15/55 |

FOREIGN PATENT DOCUMENTS

| | | |
|---|---|---|
| JP | 2014-026067 | 2/2014 |
| JP | 2017-156577 | 9/2017 |
| JP | 2017-173534 | 9/2017 |

* cited by examiner

*Primary Examiner* — Joseph S Wong
(74) *Attorney, Agent, or Firm* — Amin, Turocy & Watson, LLP

(57) ABSTRACT

An image forming apparatus includes a processing unit, a sensor, and a processor. The processing unit has a developing device using a developer containing two components of a toner and a carrier. The sensor outputs a detection value corresponding to a toner concentration of the developer during operation of the processing unit. The processor performs a process of determining whether a service call to a service person is necessary based on the detection value of the sensor. The processor operates the processing unit at either a high process speed or a low process speed to acquire the detection value of the sensor, before determining whether the service call is necessary. The processor determines the process speed at which the processing unit is to be operated based on the detection value. The processor operates the processing unit at the determined process speed to determine whether the service call is necessary.

20 Claims, 12 Drawing Sheets

1341

| THRESHOLD VALUE | ATC SENSOR OUTPUT (DIGITAL VALUE) | | ATC SENSOR OUTPUT [V] | |
|---|---|---|---|---|
| | UPPER LIMIT | LOWER LIMIT | UPPER LIMIT | LOWER LIMIT |
| TH1 | 213 | 20 | 2.75647 | 0.25882 |
| TH2 | 140 | 90 | 1.81176 | 1.16471 |
| TH3 | 176 | 55 | 2.28412 | 0.71176 |
| CV | 128 | 128 | 1.65647 | 1.65647 |

IMAGE FORMING APPARATUS

FIELD

Embodiments described herein relate generally to an image forming apparatus and a method related thereto.

BACKGROUND

An image forming apparatus placed in a workplace forms an image on paper. A typical image forming apparatus forms a latent image on a photosensitive drum by irradiating the photosensitive drum with image light from an exposure device. The image forming apparatus obtains a visible image by visualizing this latent image with a developing material (developer). The image forming apparatus temporarily moves this visible image to a transfer belt, and then moves the visible image moved to this transfer belt to the paper. Then, the image forming apparatus attaches (fixes) the visible image that moved to the paper to the paper by a fixing device.

The developer is a two-component developer containing a toner and a carrier. A concentration ratio of toner to carrier (T/C) is called a toner concentration. In the image forming apparatus, a toner replenishment amount is adjusted so that the toner concentration is maintained within a certain range. A magnetic sensor called an auto toner control (ATC) sensor is used to detect the toner concentration. The ATC sensor has, for example, a coil and detects and outputs a voltage value generated in this coil and changing according to a density of a magnetic flux from the toner. That is, the ATC sensor outputs the voltage value corresponding to the toner concentration.

Generally, a controller of the image forming apparatus reads an output value of the ATC sensor two or more times during one rotation of a mixer that stirs the toner and the carrier, and controls the toner concentration by using an averaged output value as an output value for control.

DETAILED DESCRIPTION

In general, according to one embodiment, an image forming apparatus includes a processing unit, a sensor, and a processor. The processing unit has a developing device using a developer containing two components of a toner and a carrier. The sensor outputs a detection value corresponding to a toner concentration of the developer during operation of the processing unit. The processor performs a process of determining whether a service call to a service person is necessary based on the detection value of the sensor. In particular, the processor operates the processing unit at either a high process speed or a low process speed to acquire the detection value of the sensor before determining whether the service call is necessary. The processor determines the process speed at which the processing unit is to be operated based on the detection value of the sensor. Then, the processor operates the processing unit at the determined process speed and determines whether the service call is necessary.

Hereinafter, an image forming apparatus according to one embodiment will be described with reference to the drawings. It is noted that the scale of each portion in each drawing used for the description of the following embodiment is appropriately changed. In addition, in each drawing used to describe the following embodiment, the configuration is appropriately omitted for the description.

Figure 1:
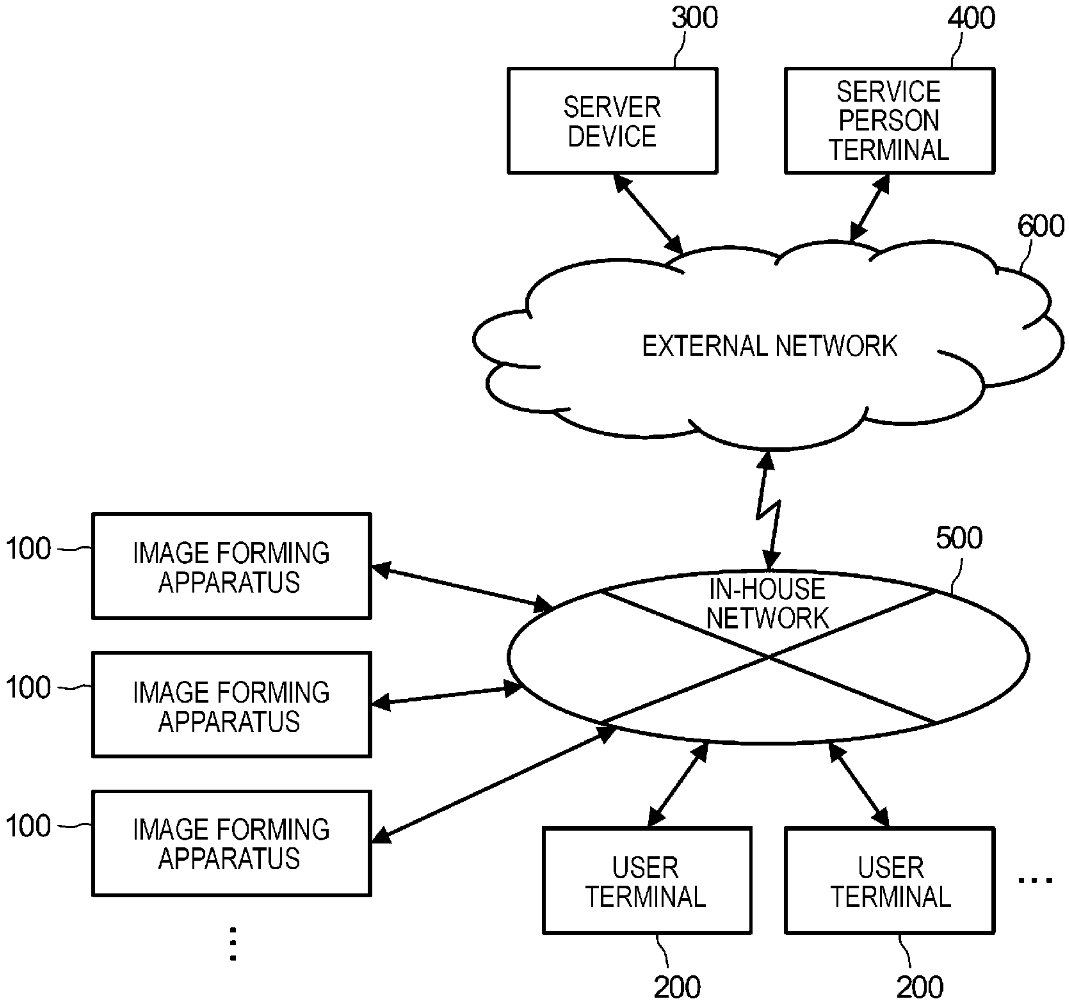
FIG. 1 is a schematic configuration diagram of a printing system including an image forming apparatus according to one embodiment.

FIG. 1 is a schematic configuration diagram of a printing system including a plurality of image forming apparatuses 100 according to one embodiment. The printing system further includes a plurality of user terminals 200, a server device 300, and a service person terminal 400. Each image forming apparatus 100 is placed in a workplace and can be communicably connected to the user terminal 200 placed in the same workplace, for example, via an in-house network 500 such as a local area network (LAN). This connection may be a wired connection or a wireless connection. In addition, the in-house network 500 is also connected to an external network 600 such as the Internet. The server device 300 and the service person terminal 400 are connected to the external network 600. Accordingly, the image forming apparatus 100 can be communicably connected to the server device 300 via the in-house network 500 and the external network 600.

The user terminal 200 is an information processing device such as a personal computer (PC), a smart phone, a tablet terminal, or a digital camera, which instructs printing by any of the image forming apparatuses 100. It is noted that the user terminal 200 may be communicably connected to the image forming apparatus 100 via the external network 600 and the in-house network 500. That is, the user terminal 200 may be outside the workplace where the image forming apparatus 100 is placed. In addition, the user terminal 200 may be directly connected to the image forming apparatus 100 without the external network 600 and the in-house network 500, that is, may be locally connected. This local connection may be wired connection or wireless connection.

The server device 300 is a computer device operated directly by a management company that undertakes the maintenance and inspection of the image forming apparatus 100 or operated by outsourcing to a service provider company. The server device 300 acquires data indicating an operation status of each image forming apparatus 100 periodically or as needed, or acquires notification data such as occurrence of a service call transmitted from the image forming apparatus 100. The server device 300 determines necessity of inspection or repair of each image forming apparatus 100 based on the acquired data. Then, if the image forming apparatus 100 that requires inspection or repair exists, the server device 300 transmits information specifying the image forming apparatus 100 to the service person terminal 400 so that the service person can be sent to inspect or repair the image forming apparatus 100.

The service person terminal 400 is an information processing device such as a smartphone or a tablet terminal carried by the service person who inspects or repairs the image forming apparatus 100. Although only one service person terminal 400 is illustrated in FIG. 1, the printing system may include a plurality of the service person terminals 400. In this case, the server device 300 can assign an appropriate service person to the image forming apparatus 100 requiring inspection or repair based on information such as position information of each service person using a position detection function provided by the service person terminal 400 and availability of each service person.

Figure 2:
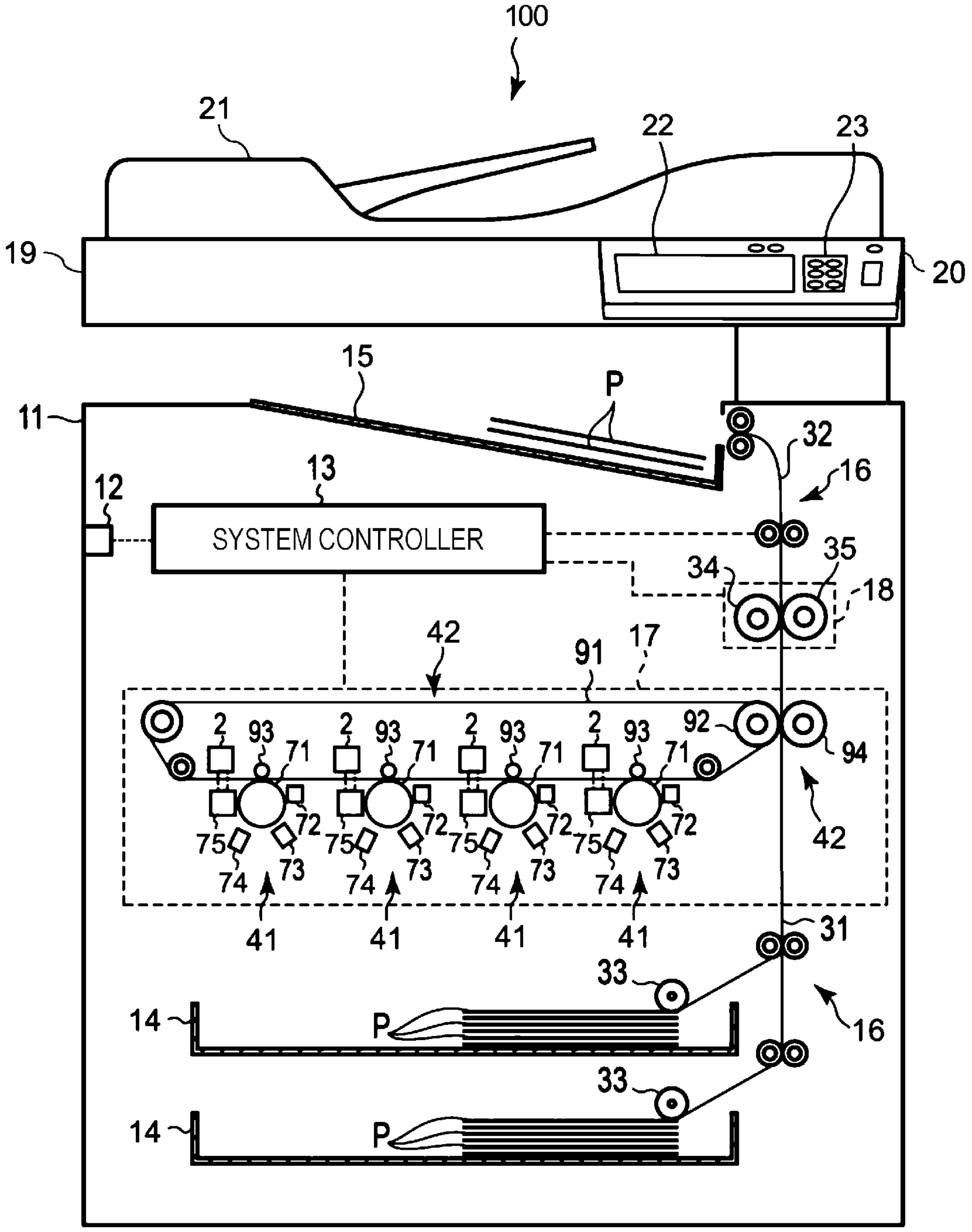
FIG. 2 is a schematic cross-sectional view illustrating an example of the image forming apparatus.

FIG. 2 is a schematic cross-sectional view illustrating an example of the image forming apparatus 100 according to one embodiment.

The image forming apparatus 100 prints by electrophotographic method. The image forming apparatus 100 is, for example, an multifunction peripheral (MFP), a copier, a printer, a facsimile machine, or the like.

The image forming apparatus 100 conveys a print medium P and forms an image on the print medium P by the electrophotographic method. The print medium P is also referred to as a recording medium, a transfer medium, paper, or the like. The image forming apparatus 100 is, for example, an MFP (multifunction peripheral), a copier, a printer, a facsimile machine, or the like. FIG. 2 illustrates the image forming apparatus 100 which is the MFP. The image forming apparatus 100 receives toner from a toner cartridge 2 and forms an image on the print medium P by using the received toner. The toner is, for example, four color toners of yellow, magenta, cyan, and black. The combination of color toners is not limited thereto. Other colors may be combined. Further, instead of combining color toners of a plurality of colors, a single color toner may be used. In addition, the toner may be a special toner. For example, the toner may be a decolorable toner that becomes invisible by decoloring at a temperature higher than a predetermined temperature.

As illustrated in FIG. 2, the image forming apparatus 100 includes, for example, a housing 11, a communication interface 12, a system controller 13, a plurality of paper trays 14, a paper discharge tray 15, a conveying unit 16, an image forming unit 17, and a fixing unit 18, a scanner unit 19, and a control panel 20.

The housing 11 is a main body of the image forming apparatus 100. The housing 11 accommodates, for example, the communication interface 12, the system controller 13, the plurality of paper trays 14, the conveying unit 16, the image forming unit 17, the fixing unit 18, and the like. A portion of an upper surface of the housing 11 serves as the paper discharge tray 15.

The communication interface 12 is an interface for communicating with other devices connected via a network. The communication interface 12 is used for communication with external devices. The external devices include, for example, the user terminal 200 and the server device 300. The communication interface 12 is configured with, for example, a LAN connector or the like. The communication interface 12 may perform wireless communication with other devices according to standards such as Bluetooth (registered trademark) or Wi-Fi (registered trademark).

The system controller 13 functions as a control unit of the image forming apparatus 100. The system controller 13 is connected to the communication interface 12. The system controller 13 generates a print job based on print data acquired from the user terminal 200, which is an external device, for example, via the communication interface 12. The print job includes image data representing an image to be formed on the print medium P. The image data may be data for forming an image on one print medium P, or may be data for forming an image on a plurality of print media P. The print job may include information indicating whether to print in color or monochrome.

The system controller 13 that generates the print job controls the operations of the conveying unit 16, the image forming unit 17, and the fixing unit 18 to form an image of the image data included in the print job on the print medium P. Specifically, the system controller 13 controls conveyance of the print medium P by the conveying unit 16, image formation on the print medium P by the image forming unit 17, and fixing of the image on the print medium P by the fixing unit 18. In this manner, the system controller 13 also functions as an engine controller of the image forming apparatus 100.

The image forming apparatus 100 may be configured to include the engine controller separately from the system controller 13. In this case, the engine controller controls at least one of conveyance of the print medium P by the conveying unit 16, image formation on the print medium P by the image forming unit 17, fixing of the image on the print medium P by the fixing unit 18, and the like. The system controller 13 supplies information necessary for control in the engine controller to the engine controller.

The plurality of paper trays 14 are cassettes that accommodate the print media P, respectively. The paper tray 14 is configured so that the print medium P can be supplied from the outside of the housing 11. For example, the paper tray 14 is configured to be pulled out from the housing 11.

The paper discharge tray 15 is a tray that receives the print medium P discharged from the image forming apparatus 100.

The conveying unit 16 is a mechanism for conveying the print medium P within the image forming apparatus 100. As illustrated in FIG. 2, the conveying unit 16 has a plurality of conveyance paths. Specifically, the conveying unit 16 includes a paper feeding conveyance path 31 and a paper discharge conveyance path 32. The paper feeding conveyance path 31 and the paper discharge conveyance path 32 are configured with a plurality of rollers, a plurality of guides, and the like. The plurality of rollers convey the print medium P by rotating with power transmitted from a drive mechanism. The plurality of guides control the conveyance direction of the print medium P conveyed by the rollers.

The paper feeding conveyance path 31 takes in the print medium P from the paper tray 14 and supplies the taken in print medium P to the image forming unit 17. The paper feeding conveyance path 31 includes a plurality of pickup rollers 33 corresponding to each paper tray 14. Each of the pickup rollers 33 takes in the print medium P from the paper tray 14 into the paper feeding conveyance path 31.

The paper discharge conveyance path 32 is a conveyance path for discharging the print medium P on which an image was formed by the image forming unit 17 from the housing 11. The print medium P discharged through the paper discharge conveyance path 32 is supported by the paper discharge tray 15.

The image forming unit 17 has a configuration for forming an image on the print medium P. Details of the image forming unit 17 will be described later.

The fixing unit 18 has a heat roller 34 and a pressure roller 35. The fixing unit 18 heats the print medium conveyed on the paper discharge conveyance path 32 with a predetermined temperature by the heat roller 34 and presses the print medium P by the pressure roller 35 to fix the image transferred to the print medium P on the print medium P.

The scanner unit 19 is a device that reads a document and converts the document into image data, and is installed on top of the housing 11. The scanner unit 19 is provided with an automatic document feeder 21, and is also capable of reading documents conveyed by the automatic document feeder 21.

The control panel 20 includes a touch panel 22, a keyboard 23, and the like. The touch panel 22 is, for example, a stack of a display such as a liquid crystal display or an organic EL display and a touch sensor detecting touch input. As information to be notified to the user of the image forming apparatus 100, for example, an image for setting various functions of the image forming apparatus 100, an image indicating a remaining amount of toner, an image of a service call, and the like are displayed on the display.

The keyboard 23 has various keys for the user of the image forming apparatus 100 to operate. For example, the keyboard 23 has numeric keys, a power key, a paper feed key, function keys, and the like. Each key may be called a button. Thus, the touch panel 22 and the keyboard 23 function as input devices of the image forming apparatus 100. The display included in the touch panel 22 functions as a display device of the image forming apparatus 100.

Next, the image forming unit 17 will be described.

As illustrated in FIG. 2, the image forming unit 17 includes a plurality of processing units 41 and a transfer unit 42. Each processing unit 41 is a unit for forming a toner image. Each processing unit 41 is provided for each type of toner. For example, each processing unit 41 corresponds to yellow, magenta, cyan, and black color toners from the left side in FIG. 2. Each processing unit 41 is provided with the toner cartridge 2 having color toner of a corresponding color.

Figure 3:
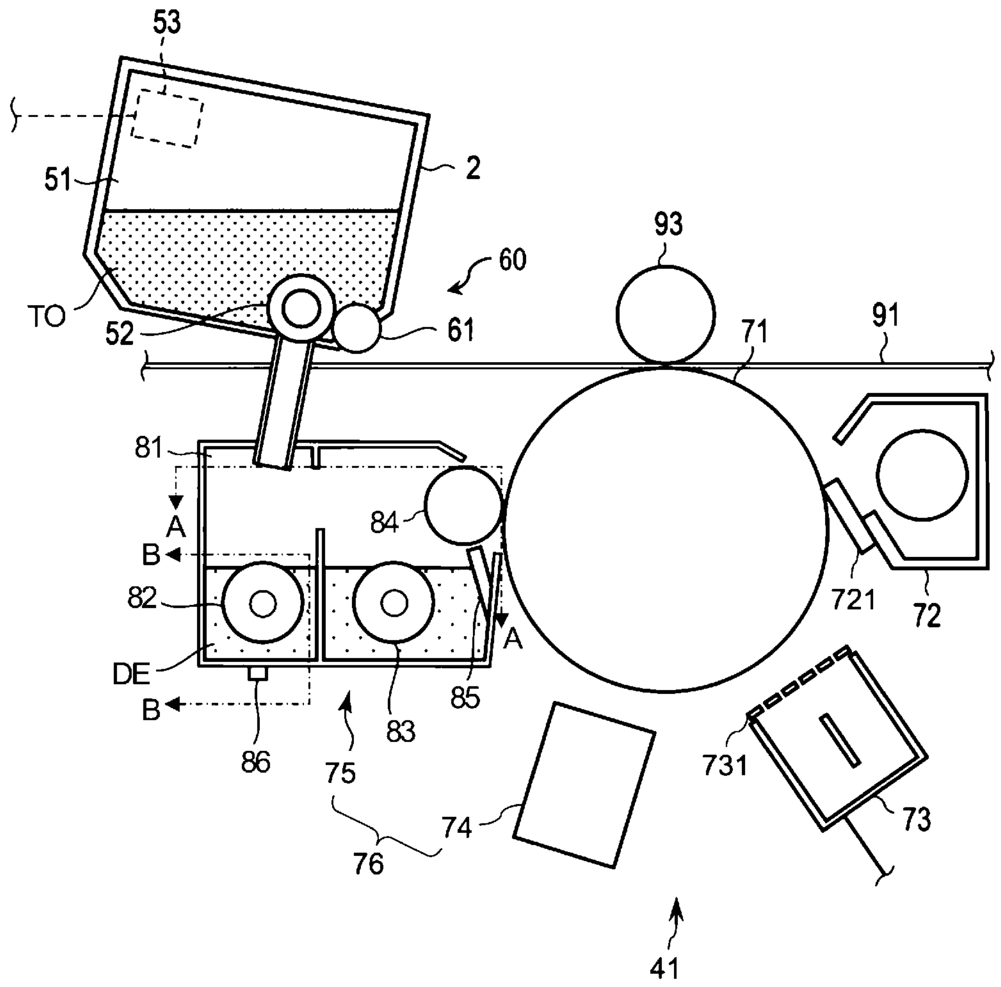
FIG. 3 is a schematic cross-sectional view illustrating an example of a configuration of main components of an image forming unit in FIG. 2.

FIG. 3 is a schematic diagram illustrating a configuration of main components of the image forming unit 17. Each toner cartridge 2 and each processing unit 41 have the same configuration. Therefore, in FIG. 3, one toner cartridge 2 and one processing unit 41 are taken as an example.

First, the toner cartridge 2 will be described. As illustrated in FIG. 3, the toner cartridge 2 includes a toner storage container 51, a toner delivery mechanism 52, and a memory 53.

The toner storage container 51 is a container that stores toner. The toner delivery mechanism 52 is a mechanism for delivering the toner inside the toner storage container 51. The toner delivery mechanism 52 is, for example, a screw provided inside the toner storage container 51. The toner in the toner storage container 51 is delivered by rotating the screw.

The toner storage container 51 is loaded into a loading unit 60. The loading unit 60 is a module in which the toner cartridge 2 filled with toner is loaded. The loading unit 60 has a toner supply motor 61. The loading unit 60 also includes a connector for connecting the memory 53 of the toner cartridge 2 and the system controller 13.

If the toner cartridge 2 is loaded into the loading unit 60, the toner supply motor 61 is connected to the toner delivery mechanism 52 of the toner cartridge 2. The toner supply motor 61 drives the toner delivery mechanism 52 under the control of the system controller 13. If the toner supply motor 61 drives the toner delivery mechanism 52, the toner in the toner storage container 51 is supplied to a developing device 75, which will be described later. The memory 53 of the toner cartridge 2 stores information such as the number of times the toner supplied to the developing device 75 by driving the toner delivery mechanism 52 and the date and time of the supply.

Next, the processing unit 41 will be described. As illustrated in FIG. 3, the processing unit 41 includes a photosensitive drum 71, a cleaner 72, a charging unit 73, an exposure head 74, and the developing device 75.

The photosensitive drum 71 is a photosensitive member including a cylindrical drum and a photosensitive layer formed on the outer peripheral surface of the drum. The photosensitive drum 71 rotates at a constant speed by power transmitted from the drive mechanism. The photosensitive drum 71 is an example of an image carrier.

The cleaner 72 has a blade 721 that is in contact with the front surface of the photosensitive drum 71. The cleaner 72 removes the toner remaining on the front surface of the photosensitive drum 71 by using the blade 721.

The charging unit 73 is a device that uniformly charges the front surface of the photosensitive drum 71. For example, the charging unit 73 applies a grid bias voltage output from a grid electrode 731 to the photosensitive drum 71 to uniformly charge the photosensitive drum 71 to a negative potential. Such a charging unit 73 is also called a charging charger. The exposure head 74 has a plurality of light emitting elements. The light emitting element is, for example, a laser diode (LD), a light emitting diode (LED), an organic EL (OLED), or the like. The plurality of light emitting elements are arranged in a main scanning direction parallel to a rotation axis of the photosensitive drum 71. Each light emitting element is configured so as to irradiate one point on the photosensitive drum 71 with light.

The exposure head 74 forms a latent image for one line on the photosensitive drum 71 by irradiating the front surface of the charged photosensitive drum 71 with the light from the plurality of light emitting elements arranged in the main scanning direction. Further, the exposure head 74 continuously irradiates the rotating photosensitive drum 71 with the light so as to form a latent image of a plurality of lines.

The developing device 75 is a device that adheres the toner to the photosensitive drum 71 to form the toner image on the photosensitive drum. The developing device 75 includes a developer container 81, a stirring side mixer 82, a developing roller side mixer 83, a developing roller 84, a doctor blade 85, an automatic toner control (ATC) sensor 86, and the like.

The developer container 81 is a container that contains the developer containing the toner and the carrier. The developer container 81 receives the toner delivered from the toner cartridge 2 by the toner delivery mechanism 52. The carrier is contained in the developer container 81 if developing device 75 is manufactured.

The stirring side mixer 82 and the developing roller side mixer 83 are inside the developer container 81. The stirring side mixer 82 and the developing roller side mixer 83 serve as stirring mechanisms to stir the toner and the carrier in the developer container 81.

The developing roller 84 rotates within the developer container 81 to adhere the developer to the front surface of the roller.

The doctor blade 85 is a member arranged at a predetermined interval separated from the front surface of the developing roller 84. The doctor blade 85 removes a portion of the developer adhering to the front surface of the rotating developing roller 84. Accordingly, a developer layer having a thickness corresponding to the interval between the doctor blade 85 and the front surface of the developing roller 84 is formed on the front surface of the developing roller 84.

The ATC sensor 86 has, for example, a coil and detects a voltage value generated in the coil. The detected voltage of the ATC sensor 86 changes according to the density of the magnetic flux from the toner inside the developer container 81. That is, the ATC sensor 86 detects a voltage corresponding to the toner concentration inside the developer container 81. The system controller 13 can determine the toner concentration in the developer container 81 based on the detected voltage of the ATC sensor 86.

Figure 4:
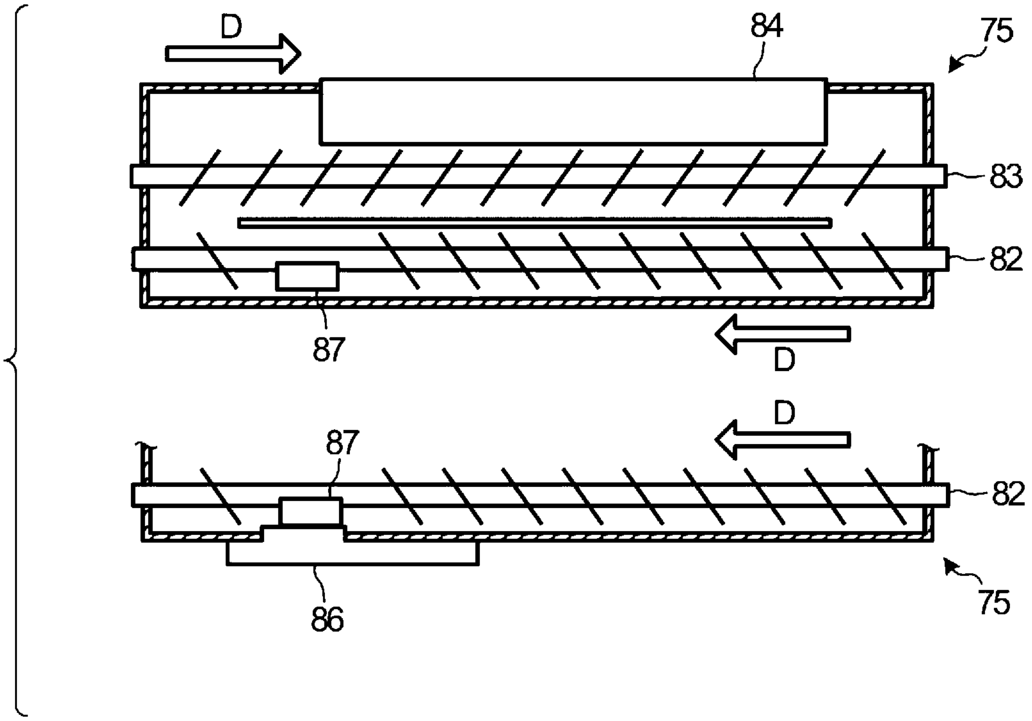
FIG. 4 is a schematic cross-sectional view illustrating an example of a configuration of main components of a developing device in FIG. 3.

FIG. 4 is a schematic cross-sectional view illustrating an example of a configuration of main components of the developing device 75. FIG. 4 illustrates two cross-sectional views, that is, a cross-sectional view taken along the line A-A and a cross-sectional view taken along the line B-B in FIG. 3.

A paddle 87 is attached to the stirring side mixer 82 at a position corresponding to the ATC sensor 86. It is noted that, in FIG. 4, each of the two cross-sectional views illustrates a paddle 87, that is, two paddles 87 are illustrated at different angles, but this only illustrates the position of the paddle 87 in an easy-to-understand manner, and only one actually exists. The ATC sensor 86 is cleaned by tracing the front surface of the ATC sensor 86 with the paddle 87.

The two-component developer containing the toner and the carrier contained in the developer container 81 is stirred with rotating of the stirring side mixer 82 and the developing roller side mixer 83 and is conveyed in the conveyance direction D as indicated by white arrows. The ATC sensor 86 detects the toner concentration, which is a density ratio of the toner to the carrier in the stirred and conveyed developer and outputs a voltage value corresponding to the toner concentration. If abnormality an such as developer abnormality or paddle abnormality occurs, the output voltage value of the ATC sensor 86 greatly changes.

The description returns to the description with reference to FIG. 3. As described above, if the front surface of the photosensitive drum 71 charged by the charging unit 73 is irradiated with light from the exposure head 74, a latent image is formed. After that, if the layer of the developer formed on the front surface of the developing roller 84 in the developing device 75 approaches the front surface of the photosensitive drum 71, the toner contained in the developer adheres to the latent image formed on the front surface of the photosensitive drum 71. Accordingly, the toner image is formed on the front surface of the photosensitive drum 71. That is, the exposure head 74 and the developing device 75 constitute an image formation unit 76.

The transfer unit 42 is configured to transfer the toner image formed on the front surface of the photosensitive drum 71 to the print medium P. As illustrated in FIGS. 2 and 3, the transfer unit 42 includes, for example, a transfer belt 91, a secondary transfer facing roller 92, a plurality of primary transfer rollers 93, and a secondary transfer roller 94.

The transfer belt 91 is an endless belt wound around the secondary transfer facing roller 92 and a plurality of winding rollers. The back surface, which is a surface inside, of the transfer belt 91 is in contact with the secondary transfer facing roller 92 and the plurality of winding rollers, and the front surface, which is a surface outside, of the transfer belt 91 faces the photosensitive drum 71 of the processing unit 41.

The secondary transfer facing roller 92 conveys the transfer belt 91 by rotating with power transmitted from the drive mechanism. The secondary transfer facing roller 92 rotates counterclockwise in FIG. 2. By this rotation, the transfer belt 91, which is an endless belt, is conveyed so as to rotate counterclockwise in FIG. 2. The plurality of winding rollers are configured to be freely rotatable. The plurality of winding rollers rotate as the transfer belt 91 is moved by the secondary transfer facing roller 92.

The plurality of primary transfer rollers 93 are provided for each processing unit 41. The plurality of primary transfer rollers 93 are provided so as to respectively face the photosensitive drums 71 of the processing units 41. Specifically, the plurality of primary transfer rollers 93 are respectively provided at positions facing the photosensitive drums 71 of the processing units 41 with the transfer belt 91 interposed therebetween. The primary transfer roller 93 is in contact with the inner peripheral surface of the transfer belt 91 and displaces the transfer belt 91 toward the photosensitive drum 71. This displacement allows the front surface of the transfer belt 91 to be into contact with the photosensitive drum 71.

The secondary transfer roller 94 is provided at a position facing the secondary transfer facing roller 92. The secondary transfer roller 94 is in contact with and applies pressure to the front surface of the transfer belt 91 conveyed on the peripheral surface of the secondary transfer facing roller 92. The contact and the pressure form a transfer nip in which the secondary transfer roller 94 and the front surface of the transfer belt 91 are in close contact with each other.

The secondary transfer roller 94 and the secondary transfer facing roller 92 rotate to convey the print medium P supplied from the paper feeding conveyance path 31 while interposing the print medium p. As a result, the print medium P passes through the transfer nip. The secondary transfer roller 94 presses the print medium P passing through the transfer nip against the front surface of the transfer belt 91.

In the transfer unit 42 configured as described above, if the front surface of the transfer belt 91 is in contact with the photosensitive drum 71, the toner image formed on the front surface of the photosensitive drum 71 is transferred (primarily transferred) to the front surface of the transfer belt 91. As illustrated in FIG. 2, if the image forming unit 17 includes the plurality of processing units 41, the toner images are transferred to the transfer belt 91 from the photosensitive drums 71 of the plurality of processing units 41. The toner image transferred to the front surface of the transfer belt 91 is conveyed to the transfer nip by the transfer belt 91. At this time, if the print medium P exists in the transfer nip, the toner image transferred to the front surface of the transfer belt 91 is transferred (secondarily transferred) to the print medium P at the transfer nip.

Next, the circuit configuration of the image forming apparatus 100 will be described.

Figure 5:
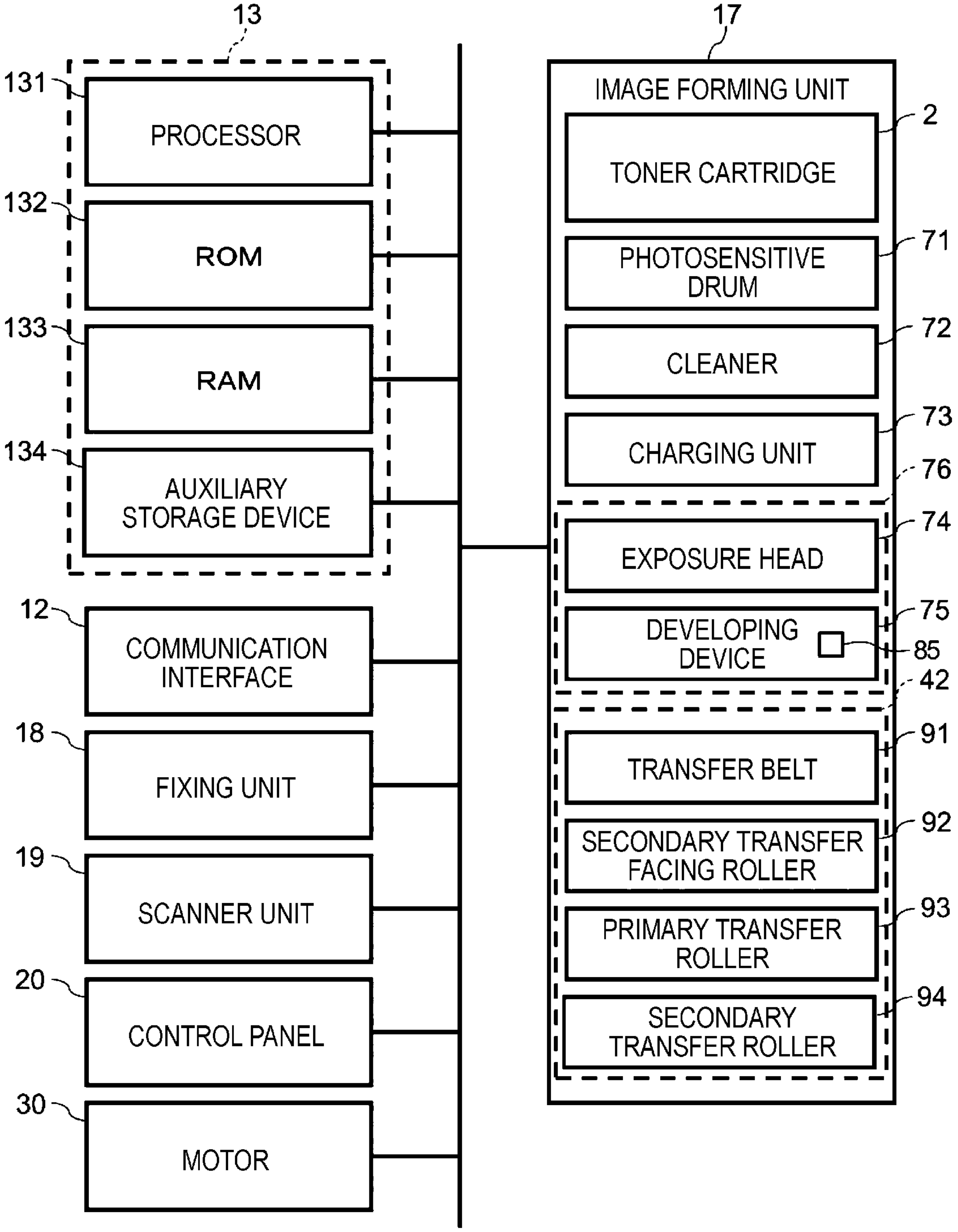
FIG. 5 is a block diagram illustrating an example of a circuit configuration of the image forming apparatus.

FIG. 5 is a block diagram illustrating an example of the circuit configuration of the image forming apparatus 100. As illustrated in the drawing, in the image forming apparatus 100, the communication interface 12, the image forming unit 17, the fixing unit 18, the scanner unit 19, the control panel 20, the motor 30, and the like are connected to the system controller 13 by signal lines to form a circuit.

The system controller 13 includes a processor 131, a read only memory (ROM) 132, a random access memory (RAM) 133 and an auxiliary storage device 134. The system controller 13 configures a computer by connecting the processor 131, the ROM 132, the RAM 133, and the auxiliary storage device 134 with signal lines.

The processor 131 corresponds to the core portion of the computer. The processor 131 controls each unit to implement various functions of the image forming apparatus 100 according to an operating system or an application program. The processor 131 is, for example, a central processing unit (CPU). The processor 131 may be, for example, a micro processing unit (MPU), a system on a chip (SoC), a digital signal processor (DSP), a graphics processing unit (GPU), an application specific integrated circuit (ASIC), a programmable logic device (PLD) or a field-programmable gate array (FPGA) or the like. Alternatively, the processor 131 may be a combination of several of these examples.

The ROM 132 and the RAM 133 correspond to the main memory portion of the computer. The ROM 132 is a non-volatile memory area, and the RAM 133 is a volatile memory area. It can also be said that the ROM 132 is a non-temporary computer-readable storage medium. The ROM 132 stores the operating system or the application programs. The ROM 132 also stores data necessary for the processor 131 to execute processing for controlling each unit. The RAM 133 is used as a work area in which data is appropriately rewritten by the processor 131.

The auxiliary storage device 134 is a non-temporary computer-readable storage medium and corresponds to the auxiliary storage portion of the computer. As the auxiliary storage device 134, for example, known storage devices such as an electric erasable programmable read-only memory (EEPROM), a hard disc drive (HDD), or a solid state drive (SSD) are used singly or in combination. The auxiliary storage device 134 saves data used by the processor 131 in performing various processes and data generated by the processes in the processor 131. In some cases, the auxiliary storage device 134 may also store the application programs.

It is noted that the image forming apparatus 100 may have an interface into which a non-temporary computer-readable storage medium such as a removable optical disc, a memory card, or a universal serial bus (USB) memory can be inserted in place of or in addition to the auxiliary storage device 134.

The application programs stored in the ROM 132 or the auxiliary storage device 134 include programs for executing the processes described later. As an example, the image forming apparatus 100 is transferred to an administrator or the like of the image forming apparatus 100 with the program stored in the ROM 132 or the auxiliary storage device 134. However, the image forming apparatus 100 may be transferred to the administrator or the like without the program stored in the ROM 132 or the auxiliary storage device 134. Then, a program for executing the processing described later may be separately transferred to the administrator or the like, and may be written to the ROM 132 or the auxiliary storage device 134 under the operation of the administrator or the service person. At this time, the transfer of the program can be achieved by recording the program on a removable, non-temporary computer-readable storage medium such as a magnetic disk, a magneto-optical disk, an optical disk, or a semiconductor memory, or by downloading the program via a network or the like.

The system controller 13 connects the toner cartridge 2 of the image forming unit 17, the photosensitive drum 71, the cleaner 72, the charging unit 73, the image formation unit (the exposure head 74 and the developing device 75 (ATC sensor 86)) 76, the transfer unit (the transfer belt 91, the secondary transfer facing roller 92, the primary transfer roller 93, and the secondary transfer roller 94) 42 by respective signal lines. The system controller 13 controls the toner cartridge 2, the photosensitive drum 71, the cleaner 72, the charging unit 73, the image formation unit 76, the transfer unit 42, and the fixing unit 18, which are provided for each processing unit 41, respectively, to form an image on the print medium P.

The motor 30 includes a first motor used in the drive mechanism that drives the conveying unit 16, a second motor used in the drive mechanism that rotates the photosensitive drum 71, and a third motor used in the drive mechanism that rotates the secondary transfer facing roller 92. The plurality of second motors are provided corresponding to the photosensitive drums 71 respectively provided in the plurality of processing units 41. The motors 30 may include motors used in drive mechanisms other than the drive mechanisms described above. The motor 30 is, for example, a brushless motor. The motor 30 may be a brush motor.

Figures 6, 7:
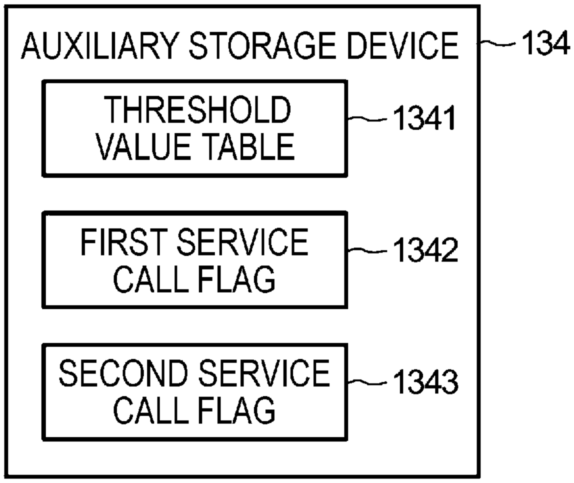
FIG. 6 is a schematic diagram illustrating an example of storage contents of an auxiliary storage device in FIG. 5.
FIG. 7 is a schematic diagram illustrating an example of contents of a threshold value table in FIG. 6.

FIG. 6 is a schematic diagram illustrating an example of the storage contents of the auxiliary storage device 134. In this embodiment, the auxiliary storage device 134 stores a threshold value table 1341, a first service call flag 1342, and a second service call flag 1343.

Figure 8:
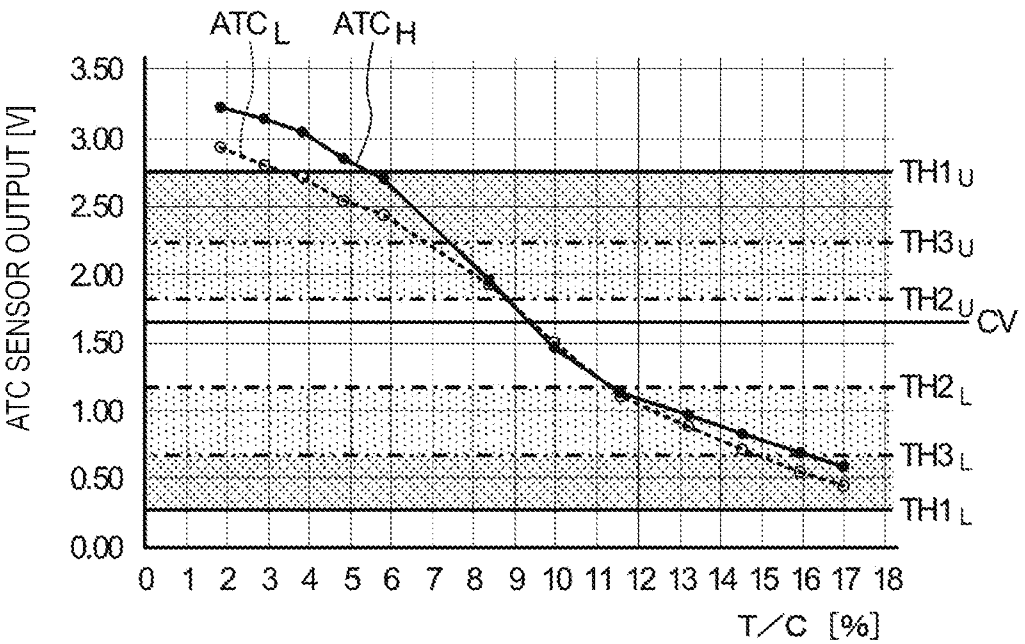
FIG. 8 is a graph illustrating an example of a relationship between toner concentration (T/C) and ATC sensor output.

The threshold value table 1341 stores a plurality of threshold values for the output voltage value of the ATC sensor 86. FIG. 7 is a schematic diagram illustrating an example of the contents of this threshold value table 1341. It is noted that, for reference, FIG. 7 illustrates an analog output value of the ATC sensor 86 as an ATC sensor output [V]. In practice, the threshold value table 1341 stores an 8-bit value obtained by analog-to-digital conversion of an analog output value indicated as the ATC sensor output (digital value). FIG. 8 is a graph illustrating an example of the relationship between the toner concentration (T/C) and the ATC sensor output.

As illustrated in FIG. 7, the threshold value table 1341 stores two types of threshold values including an upper limit value and a lower limit value for each of three types of threshold values including a machine stop threshold value TH1, a toner replenishment threshold value TH2, and a service call threshold value TH3. In addition, the threshold value table 1341 stores center values CV. The center values CV have neither an upper limit value nor a lower limit value, and are the same.

The machine stop threshold value TH1 corresponds to a threshold value for determining whether to stop the machine and generate a service call based on the ATC sensor output value in the related art. That is, if the ATC sensor output value becomes the upper limit value or more of the machine stop threshold value TH1 or becomes the lower limit value or less of the machine stop threshold value TH1, the processor 131 of the system controller 13 stops the machine and performs the service call to allow the developing device 75 to be inspected by the service person. The upper limit value of the machine stop threshold value TH1 is a machine stop upper limit threshold value $TH1_U$ indicated by a solid line in FIG. 8, and the lower limit value of the machine stop threshold value TH1 is a machine stop lower limit threshold value $TH1_L$ indicated by a solid line in FIG. 8.

The toner replenishment threshold value TH2 is a threshold value for determining whether to replenish toner from the toner cartridge 2 based on the ATC sensor output value. That is, if the ATC sensor output value becomes the upper limit value or more of the toner replenishment threshold value TH2, the processor 131 of the system controller 13 forcibly replenishes the toner from the toner cartridge 2. The upper limit value of the toner replenishment threshold value TH2 is a forced replenishment upper limit threshold value $TH2_U$ indicated by a one-dot dashed line in FIG. 8. Further, if the ATC sensor output value becomes the lower limit value or less of the toner replenishment threshold value TH2, the processor 131 prohibits replenishment of the toner from the toner cartridge 2. The lower limit value of this toner replenishment threshold value TH2 is a replenishment prohibition lower limit threshold value $TH2_L$ indicated by a one-dot dashed line in FIG. 8.

The service call threshold value TH3 is a threshold value for determining whether to generate a service call without stopping the machine based on the ATC sensor output value. That is, in the case where the ATC sensor output value is the upper limit value or more of the service call threshold value TH3, or is the lower limit value or less of the service call threshold value TH3, the processor 131 of the system controller 13 makes a service call without stopping the machine to allow a service person to inspect the developing device 75. The upper limit value of the service call threshold value TH3 indicated by a two-dot dashed line in FIG. 8 is a service call upper limit threshold value $TH3_U$, and the lower limit value of the service call threshold value TH3 is a service call lower limit threshold value $TH3_L$ indicated by a two-dot dashed line in FIG. 8.

As described above, the machine stop threshold value TH1 is a first threshold value corresponding to the first toner concentration at which it is to be determined that the first service call requesting inspection by a service person with stopping the image forming apparatus 100 is necessary, the machine stop upper limit threshold value $TH1_U$ is an upper first threshold value larger than a specified value such as the center value CV, and the machine stop lower limit threshold value $TH1_L$ is a lower first threshold value smaller than the specified value. Further, the service call threshold value TH3 is a second threshold value corresponding to the second toner concentration at which it is to be determined that the second service call requesting inspection by a service person without stopping the image forming apparatus 100 is necessary, the service call upper limit threshold value TH3*u* is an upper second threshold value larger than the specified value, and the service call lower limit threshold value $TH3_L$ is a lower second threshold value smaller than the specified value.

As described above, if the ATC sensor output value is the machine stop upper limit threshold value $TH1_U$ or more, the machine is stopped. Therefore, the service call is made without stopping the machine is the case where the ATC sensor output value is a value in the range of being the service call upper limit threshold value TH3*u* or more and being less than the machine stop upper limit threshold value $TH1_U$, which is the range indicated by dark hatching in FIG. 8. Similarly, if the ATC sensor output value is the machine stop lower limit threshold value $TH1_L$ or less, the machine is stopped. Therefore, the service call is made without stopping the machine is the case where the ATC sensor output value is a value in the range of being the service call lower limit threshold value $TH3_L$ or less and being more than the machine stop lower limit threshold value $TH1_L$, which is the range indicated by dark hatching in FIG. 8.

The same can be said for adjusting toner replenishment without a service call. That is, if the ATC sensor output value is the service call upper limit threshold value TH3*u* or more, a service call is made. Therefore, toner is forcibly replenished without a service call is the case where the ATC sensor output value is a value in the range of being the forced replenishment upper limit threshold value $TH2_U$ or more and being less than the service call upper limit threshold value $TH3_U$, which is the range indicated by light hatching in FIG. 8. Similarly, if the ATC sensor output value is the service call lower limit threshold value $TH3_L$ or less, a service call is made. Therefore, toner replenishment is forcibly prohibited without a service call is the case where the ATC sensor output value is a value in the range of being the replenishment prohibition lower limit threshold value $TH2_L$ or less and being more than the service call lower limit threshold value $TH3_L$, which is the range indicated by light hatching in FIG. 8.

It is noted that the ATC sensor output value depends on the process speed. For example, if thick paper is used as the print medium P, the processor 131 switches to a lower process speed than the normal process speed. The process speed is an operating speed of the processing unit 41, according to the speed, the processor 131 controls the speed of mechanical systems such as the motor 30 that drives the conveying unit 16, the photosensitive drum 71, and the like, and also controls the timing of the electrical system such as the exposure head 74. Hereinafter, the normal process speed is referred to as a high process speed, and the lower process speed will be referred to as a low process speed. If the process speed changes, rotational speeds of the stirring side mixer 82 and the developing roller side mixer 83 inside the developer container 81 change. Accordingly, the moving speed of the developer in the developer container 81, the number of times per unit time that the paddle 87 attached to the stirring side mixer 82 traces the front surface of the ATC sensor 86, the aerodynamic force at the time of reading the ATC sensor 86, and the like change, and as a result, even with the same toner concentration, the ATC sensor output value changes. In FIG. 8, an ATC sensor output curve $ATC_H$ at the time of a high process speed which is the relationship of the ATC sensor output value to the toner concentration at the high process speed is indicated by a solid line, and an ATC sensor output curve $ATC_L$ at the time of a low process speed which is the relationship of the ATC sensor output value to the toner concentration at the low process speed is indicated by a dashed line. As described above, if the process speed is high, the ATC sensor output value is larger than if the process speed is low.

The first service call flag 1342 is a first flag set to "1" if an abnormality such as a failure occurs and a service call requesting inspection by a service person is required, and is prepared for each processing unit 41. The first service call flag 1342 may be configured as a multi-bit flag in which one bit is used for each processing unit 41. For example, since there are four processing units 41 in the example of FIG. 2, the first service call flag 1342 can be a 4-bit flag. In addition, the first service call flag 1342 may be a 1-bit flag for the image forming apparatus 100 instead of for each processing unit 41. However, in that case, it is necessary to separately store information indicating which the processing unit 41 is the cause of the flag setting.

The second service call flag 1343 is a second flag set to "1" if a service call requesting inspection by a service person is required due to a sign of an abnormality occurring although no abnormality was occurred yet, and one bit is prepared for each processing unit 41. Since there are four processing units 41 in the example of FIG. 2, the second service call flag 1343 is configured with 4 bits.

Hereinafter, the operations of the image forming apparatus 100 according to one embodiment will be described below with reference to FIGS. 9 to 11. It is noted that the contents of the processing in the following description of the operation are only examples, and various processing that can obtain similar effects can be used as appropriate.

Figure 9:
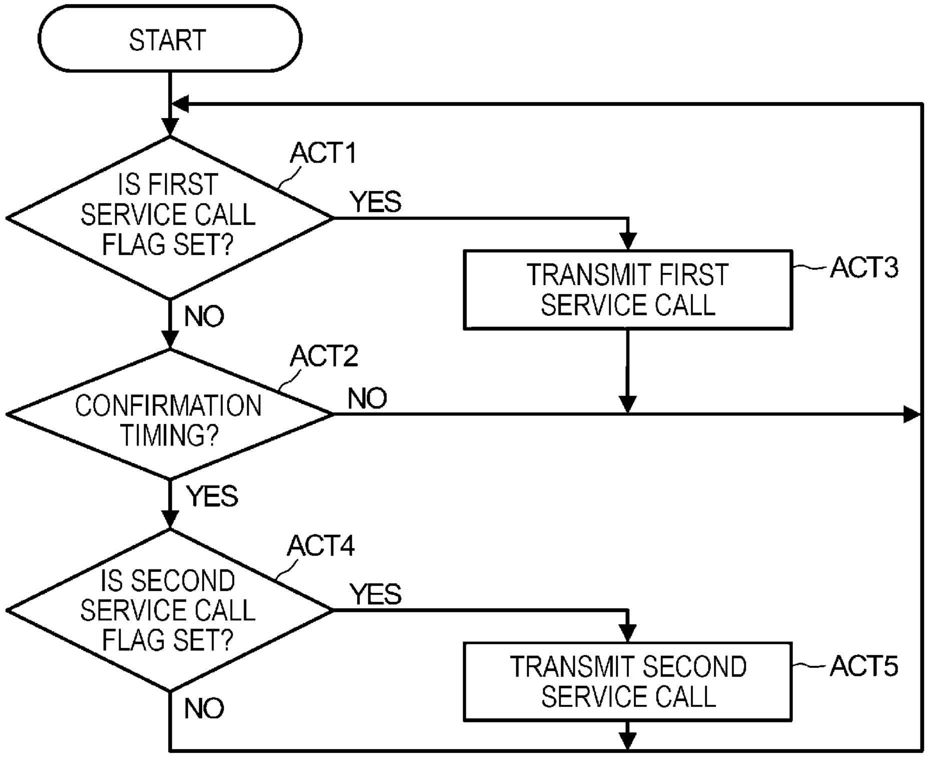
FIG. 9 is a flowchart illustrating an example of a server notification operation by the image forming apparatus.

FIG. 9 is a flowchart illustrating an example of a server notification operation by the image forming apparatus 100 according to one embodiment. The processor 131 executes this processing based on the programs stored in the ROM 132, the auxiliary storage device 134, or the like. It is noted that, unless otherwise specified, the processing of the processor 131 proceeds to ACT (x+1) after ACTx (x is a natural number).

If a power switch provided on the control panel 20 or the housing 11 of the image forming apparatus 100 is operated so that the power is turned on, the image forming apparatus 100 starts the processing illustrated in FIG. 9.

In ACT1, the processor 131 determines whether the first service call flag 1342 is set. The first service call flag 1342 is set as necessary in the abnormality occurrence prediction operation as described later with reference to FIGS. 10 and 11. The processor 131 performs determination regarding the first service call flags 1342 corresponding to all the processing units 41.

Based on the determination that the first service call flag 1342 for any processing unit 41 is not set (ACT1, NO), the processor 131 determines in ACT2 whether it is a timing of confirming the second service call flag 1343. The confirmation timing is, for example, if the power is turned on. Further, the confirmation timing may be a predetermined timing such as a specified time or every specified number of the image formations. Based on the determination that it is not the confirmation timing (ACT2, NO), the processor 131 proceeds to the processing operation of ACT1 described above.

As described above, the processor 131 waits for the first service call flag to be set or for the service call confirmation timing.

Then, based on the determination that the first service call flag 1342 related to any of the processing units 41 is set (ACT1, YES), in ACT3, the processor 131 transmits the first service call to the server device 300 via the communication interface 12. The first service call is a service call requesting an urgent inspection by a service person because an abnormality such as a failure was occurred. After that, the processor 131 proceeds to the processing operation of ACT1.

In this manner, the processor 131 constantly confirms whether the first service call flag 1342 is set, and if the first service call flag is set, the processor 131 can immediately request the server device 300 for urgent inspection by a service person.

In addition, based on the determination that it is confirmation timing (ACT2, YES), in ACT4, the processor 131 determines whether the second service call flag 1343 is set. The second service call flag 1343 is set as necessary in the abnormality occurrence prediction operation as described later with reference to FIGS. 10 and 11. The processor 131 performs determination regarding the second service call flags 1343 corresponding to all the processing units 41.

Based on the determination that the second service call flag 1343 for any processing unit 41 is not set (ACT4, NO), the processor 131 proceeds to the processing operation of ACT1.

Based on the determination that the second service call flag 1343 related to any processing unit 41 is set (ACT4, YES), in ACT5, the processor 131 transmits the second service call to the server device 300 via the communication interface 12. The second service call is a service call requesting an inspection by a service person in the near future because there are signs of abnormality occurrence although no abnormality was occurred yet. After that, the processor 131 proceeds to the processing operation of ACT1.

In this manner, the processor 131 confirms whether the second service call flag is set at the confirmation timing, that is, confirms in case of an urgent timing, and if the second service call flag is set, the server device 300 can be requested to perform an inspection by the service person in the near future.

Figure 10:
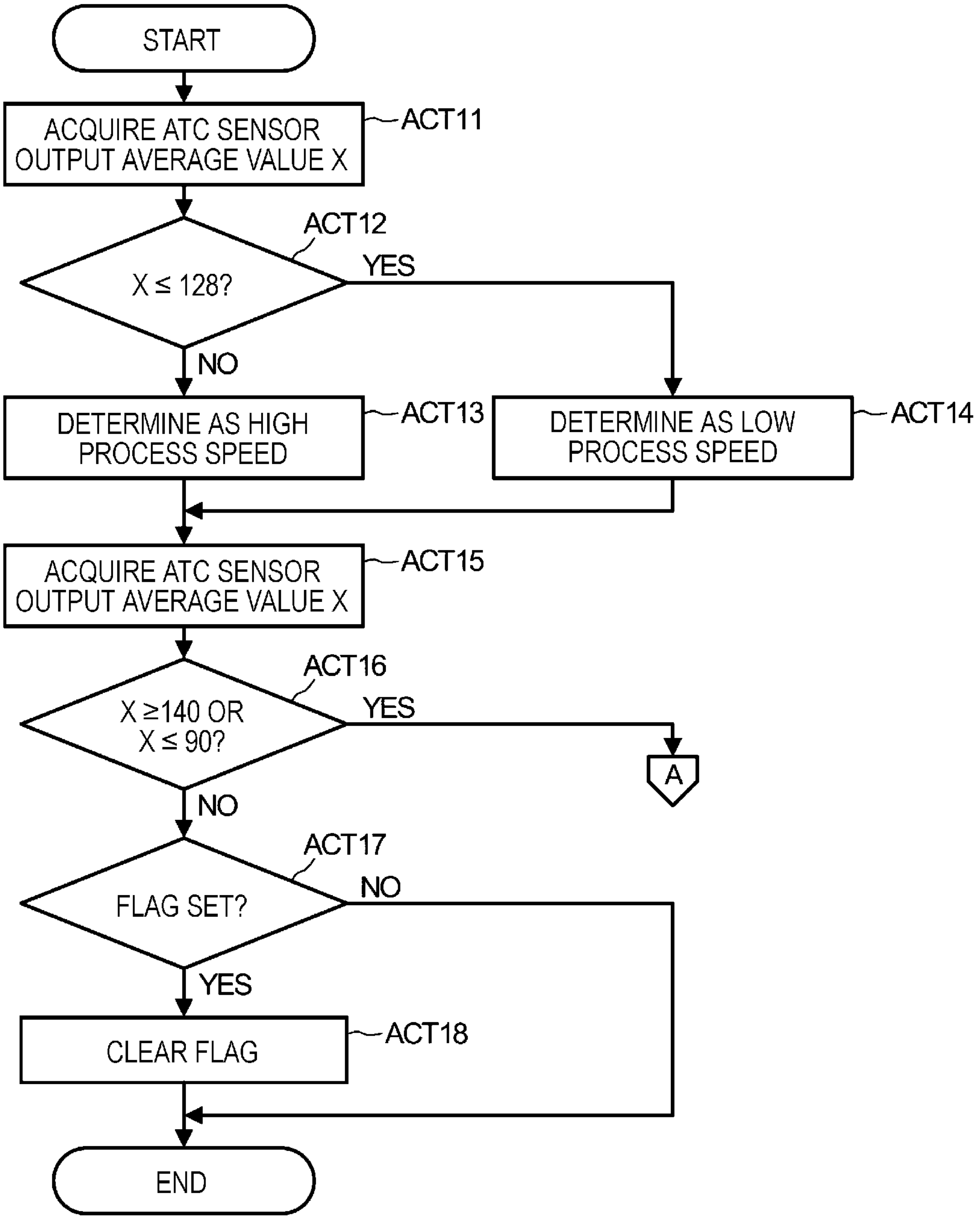
FIG. 10 is a diagram illustrating a first portion of a flowchart illustrating an example of an abnormality occurrence prediction operation by the image forming apparatus.
Figure 11:
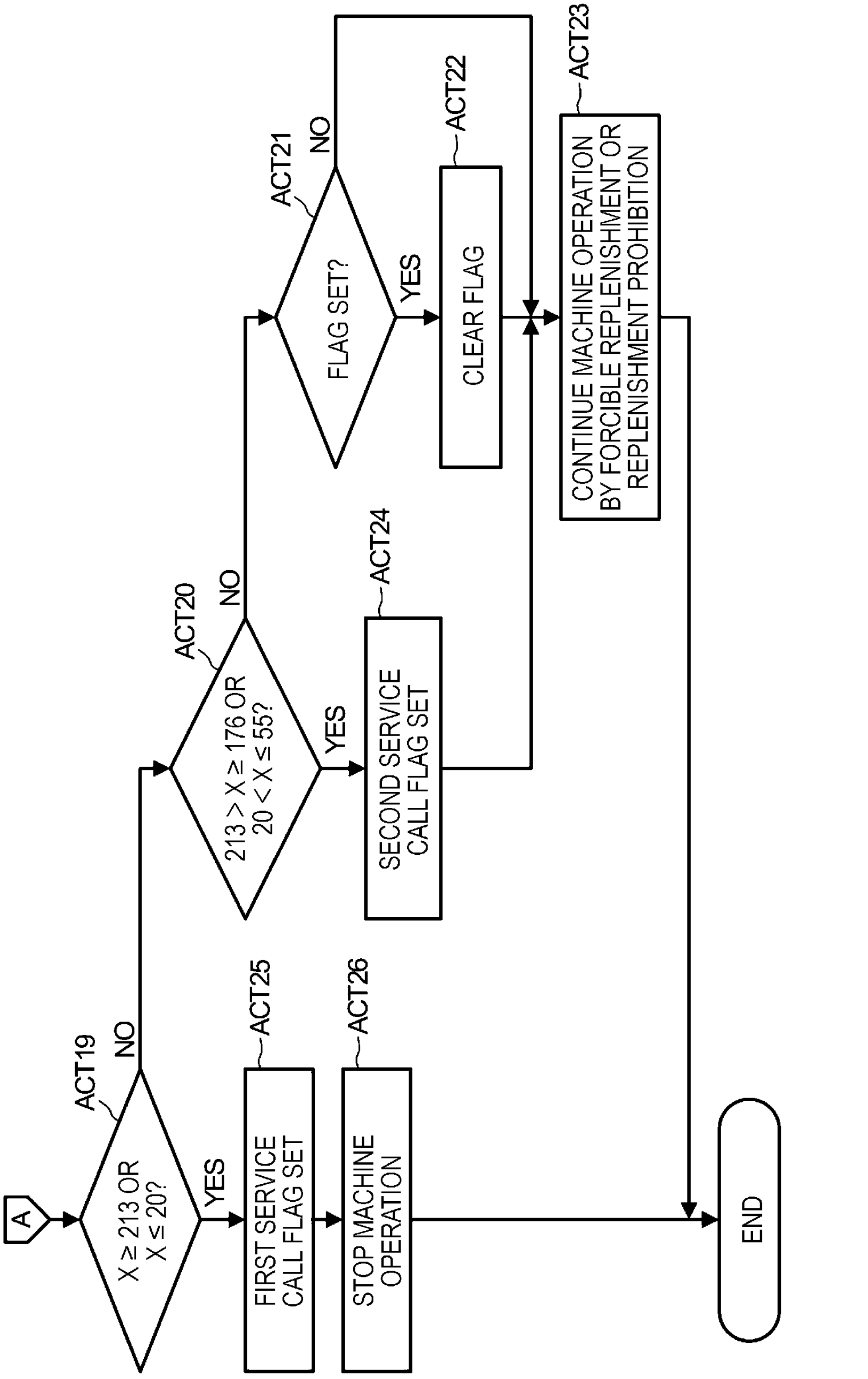
FIG. 11 is a diagram illustrating a second portion of the flowchart illustrating the example of the abnormality occurrence prediction operation by the image forming apparatus.

FIGS. 10 and 11 are a series of flowcharts illustrating an example of the abnormality occurrence prediction operation by the image forming apparatus 100 according to one embodiment. The processor 131 executes the processing individually for each of the plurality of processing units 41 based on the programs stored in the ROM 132, the auxiliary storage device 134, or the like. The processor 131 may perform processing for each processing unit 41 in time series, and if the processor 131 is capable of simultaneously executing a plurality of information processing by using, for example, a multi-core and multi-thread CPU, the processor 131 may simultaneously perform the processes for all the processing units 41 in parallel.

For example, if the power of the image forming apparatus 100 is turned on, the processes illustrated in FIGS. 10 and 11 start. Furthermore, the processor 131 may execute this process at fixed time intervals such as one hour or three hours or may execute this process each time image formation is achieved for a predetermined number of print media P such as 1000 sheets. That is, the processor 131 can perform this process multiple times for one day.

In ACT11, the processor 131 operates the processing unit 41 multiple times by using an any process speed such as a high process speed to read the ATC sensor output values of the ATC sensor 86 provided in the processing unit 41 and acquire the average value X. Hereinafter, this average value X will be referred to as an ATC sensor output average value X.

In ACT12, the processor 131 determines whether the acquired ATC sensor output average value X is a default value '128' or less. Herein, the default value '128' is a center value CV stored in the threshold value table 1341. Therefore, in ACT12, the processor 131 determines whether the ATC sensor output average value X is the center value CV or less.

Based on the determination that the ATC sensor output average value X is not '128' or less (ACT12, NO), the processor 131 determines the process speed to the processing unit 41 as a high process speed in ACT13. As illustrated in FIG. 8, on the side where the ACT sensor output value is large, the ATC sensor output curve $ATC_H$ at the high process speed other than the ATC sensor output curve $ATC_L$ at the low process speed reaches the service call upper limit threshold value $TH3u$ of the service call threshold value TH3 and the machine stop upper limit threshold value $TH1_U$ of the machine stop threshold value TH1 at a time point where toner concentration change is small. That is, on the side where the ACT sensor output value is large, an abnormality in the toner concentration can be detected earlier if the high process speed is used than if the low process speed is adopted. Therefore, in this ACT13, the processor 131 determines to increase the process speed.

In addition, based on the determination that the ATC sensor output average value X is '128' or less (ACT12, YES), the processor 131 determines in ACT14 that the process speed for the processing unit 41 is the low process speed. As illustrated in FIG. 8, on the side where the ACT sensor output value is small, the ATC sensor output curve $ATC_L$ at the low process speed other than the ATC sensor output curve $ATC_H$ at the high process speed reaches the service call lower limit threshold value $TH3_L$ of the service call threshold value TH3 and the machine stop lower limit threshold value $TH1_L$ of the machine stop threshold value TH1 at a time point where toner concentration change is small. In other words, on the side where the ACT sensor output value is small, an abnormality in the toner concentration can be detected earlier if the low process speed is used than if the high process speed is adopted. Therefore, in this ACT14, the processor 131 determines to decrease the process speed.

If the process speed is determined in this manner, the processor 131 operates the processing unit 41 multiple times by using the determined process speed in ACT15 to read the ATC sensor output values of the ATC sensor 86 provided in the processing units 41 and acquire the ATC sensor output average value X. It is noted that, if processing for all the processing units 41 is simultaneously executed in parallel, if the processing units 41 for which different process speeds were determined exist, the processor 131 may separate the processing units 41 by process speed and may acquire the ATC sensor output average value X for each of the processing units 41.

In ACT16, the processor 131 determines whether the acquired ATC sensor output average value X is '140' or more or '90' or less. Herein, '140' is the forced replenishment upper limit threshold value $TH2_U$ of the toner replenishment threshold value TH2 stored in the threshold value table 1341, and '90' is the replenishment prohibition lower limit threshold value $TH2_L$ of the toner replenishment threshold value TH2 stored in the threshold value table 1341. Therefore, in ACT12, the processor 131 determines whether the ATC sensor output average value X deviates from the normal range.

In response to the determination that the ATC sensor output average value X is not that '140' or more or '90' or less, that is, is in the normal range (ACT16, NO), in ACT17, the processor 131 determines whether the first service call flag 1342 or the second service call flag 1343 is set to "1".

In response to the determination that none of the flags have been set (ACT17, NO), the processor 131 ends the processing of the abnormality occurrence prediction operation.

In response to the determination that at least one flag is set (ACT17, YES), in ACT18, the processor 131 clears the set flag to "0". After that, the processor 131 ends the processing of the abnormality occurrence prediction operation.

In addition, in response to the determination that the ATC sensor output average value X is '140' or more or '90' or less, that is, deviates from the normal range (ACT16, YES), in ACT19, the processor 131 determines whether the acquired ATC sensor output average value X is '213' or more or '20' or less. Herein, '213' is the machine stop upper limit threshold value $TH1_U$ of the machine stop threshold value TH1 stored in the threshold value table 1341, and '20' is the machine stop lower limit threshold value $TH1_L$ of the machine stop threshold value TH1 stored in the threshold value table 1341. Therefore, in ACT19, the processor 131 determines whether the ATC sensor output average value X is within the range for stopping the machine.

In response to the determination that the ATC sensor output average value X is not that '213' or more or '20' or less, that is, does not reach the range for stopping the machine (ACT19, NO), in ACT20, the processor 131 determines whether the acquired ATC sensor output average value X is less than '213' and '176' or more, or whether the ATC sensor output average value X is greater than '20' and '55' or less. Herein, '176' is the service call upper limit threshold value $TH3u$ of the service call threshold value TH3 stored in the threshold value table 1341, and '55' is the service call lower limit threshold value $TH3_L$ of the service call threshold value TH3 stored in the threshold value table 1341. Therefore, in ACT20, the processor 131 determines whether the ATC sensor output average value X is within a range where a service call is made without stopping the machine. Herein, in other words, since it was determined in ACT16 that the ATC sensor output average value X deviates from the normal range, in ACT20, the processor 131 determines whether the ATC sensor output average value X is within the range where toner is forcibly replenished without a service call or toner replenishment is forcibly prohibited without a service call.

In response to the determination that the ATC sensor output average value X is not that less than '213' and '176' or more and is not that more than '20' and '55' or less, that is, in the range where toner is forcibly replenished without a service call or toner replenishment is forcibly prohibited without a service call (ACT20, NO), in ACT21, the processor 131 determine whether the first service call flag 1342 or the second service call flag 1343 is set to "1". In response to the determination that none of the flags is set (ACT17, NO), the processor 131 proceeds to the processing operation of ACT23, which will be described later.

In response to the determination that at least one flag is set (ACT21, YES), in ACT22, the processor 131 clears the set flag to "0". After that, the processor 131 proceeds to the processing operation of ACT23.

In ACT23, the processor 131 continues machine operation by forcibly replenishing the toner TO from the toner cartridge 2 or forcibly prohibiting the toner replenishment. That is, if the ATC sensor output average value X is less than '176' and is '140' or more, the processor 131 forms an image while forcibly replenishing the toner TO from the toner cartridge 2 during subsequent operation of the image forming apparatus 100. Further, if the ATC sensor output average value X is more than '55' and is '90' or less, the processor 131 forms an image while prohibiting replenishment of the toner TO from the toner cartridge 2 during subsequent operation of the image forming apparatus 100. After that, the processor 131 ends the processing of the abnormality occurrence prediction operation.

In response to the determination that the ATC sensor output average value X is less than '213' and is '176' or more, or is more than '20' and is '55' or less, that is, is within the range where a service call is made without stopping the machine (ACT20, YES), in ACT24, the processor 131 sets the second service call flag 1343 to "1". After that, the processor 131 proceeds to the processing operation of ACT23.

In response to the determination that the ATC sensor output average value X is '213' or more or '20' or less, that is, reaches the range for stopping the machine (ACT19, YES), in ACT25, the processor 131 sets the first service call flag 1342 to "1". The processor 131 immediately detects that first service call flag 1342 is set to "1" in the processing operations of ACT1 and ACT3 described above and transmits the first service call to the server device 300.

Figure 12:
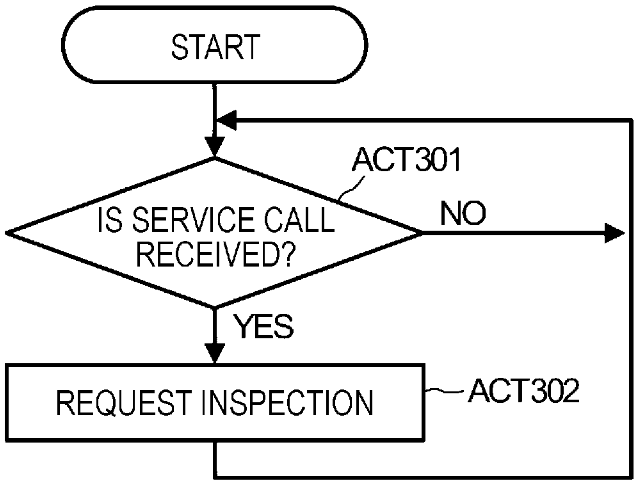
FIG. 12 is a flowchart illustrating an example of an operation of a server device in FIG. 1.

FIG. 12 is a flowchart illustrating an example of the operation of the server device 300. A processor (not illustrated) included in the server device 300 waits to receive the first or second service call from any of the image forming apparatuses 100 in ACT301 if the operation is started by the power turned on.

In response to the determination that the first or second service call is received from any of the image forming apparatuses 100 (ACT301, YES), in ACT302, the processor of the server device 300 transmits the inspection request based on the service call to the service person terminal 400. That is, if the first service call is received, the processor specifies the service person who can handle the image forming apparatus 100 which is the transmission source and requests the service person to perform an urgent inspection. Further, if the second service call is received, the processor specifies the service person who can handle the image forming apparatus 100 which is the transmission source and requests the service person to perform an inspection in the near future.

As described above, the image forming apparatus 100 according to the embodiment includes the processing unit 41 having the developing device 75 using the developer DE containing two components of the toner TO and the carrier, the ATC sensor 86 configured to output the detection value corresponding to the toner concentration of the developer DE during the operation of the processing unit 41, and the processor 131 configured to perform the process of determining whether the service call to the service person is necessary based on the detection value of the ATC sensor 86. In particular, the processor 131 performs: the process of operating the processing unit 41 at either a high process speed or a low process speed to acquire the detection value of the ATC sensor 86, before determining whether the service call is necessary; the process of determining the process speed at which the processing unit 41 is to be operated based on the detection value of the ATC sensor 86; and the process of operating the processing unit 41 at the determined process speed to determine whether the service call is necessary. Therefore, by appropriately switching the process speed, the need for the service call can be determined at an earlier stage.

Further, the image forming apparatus 100 according to the embodiment further includes the threshold value table 1341 that is a memory configured to store the machine stop threshold value TH1 that is a first threshold value corresponding to the first toner concentration at which it is to be determined that the first service call requesting inspection by a service person with stopping the image forming apparatus 100 is necessary and the service call threshold value TH3 that is a second threshold value corresponding to the second toner concentration at which it is to be determined that the second service call requesting inspection by a service person without stopping the image forming apparatus 100 is necessary. Then, in the process of determining whether a service call is necessary, the processor 131 performs a process of comparing the detection value of the ATC sensor 86 detected by operating the processing unit 41 at the determined process speed with the machine stop threshold value TH1 and the service call threshold value TH3, and determining whether the first and second service calls to the service person are necessary based on the result. Therefore, since it is possible to determine that such a situation is approaching before the image forming apparatus 100 being urgently stopped and to request an inspection by a service person, the inspection by the service person is performed before the urgent stop of the image forming apparatus 100 occurs. Accordingly, the problem can be solved at an early stage, and thus, the situation in which the image forming apparatus 100 is stopped urgently and hinders the use by the user can be reduced.

It is noted that, although the processor 131 transmits the first and second service calls to the server device 300 in the embodiment, but in addition to or instead of that, the first and second service calls may be displayed on a display that constitutes the touch panel 22 of the control panel 20. A user who confirmed the first or second service call displayed on this display can contact the management company or the service provider company that operates the server device 300 and can request inspection by a service person.

Modified Example 1

In one embodiment, while the power is on, the server notification operation as described with reference to FIG. 9 is performed, a first or second service call is transmitted to the server device 300 as necessary.

Since the second service call is not urgent, for example, the service call may be transmitted to the server device 300 at midnight if the power is turned off and the image forming apparatus 100 is not used.

Figure 13:
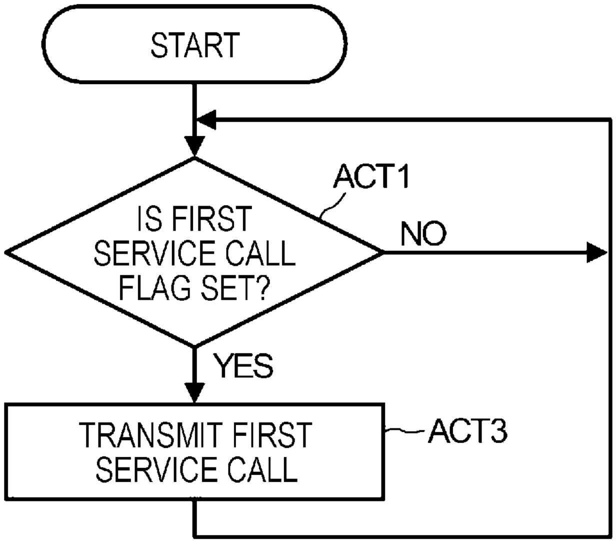
FIG. 13 is a flowchart illustrating an example of a power-on server notification operation by an image forming apparatus according to Modified Example 1 of one embodiment.

FIG. 13 is a flowchart illustrating an example of the power-on server notification operation by the image forming apparatus 100 in this case. The processor 131 of the image forming apparatus 100 executes the process illustrated in FIG. 13 while the power is on.

In ACT1, the processor 131 waits for the first service call flag 1342 to be set.

Then, based on the determination that the first service call flag 1342 related to any of the processing units 41 is set (ACT1, YES), in ACT3, the processor 131 transmits the first service call to the server device 300 via the communication interface 12. After that, the processor 131 proceeds to the processing operation of ACT1 described above.

In this manner, the processor 131 always confirms whether the first service call flag 1342 is set while the power-on image forming apparatus 100 is in operation, and if the flag is set, an urgent inspection by a service person can be immediately requested to the server device 300.

Figure 14:
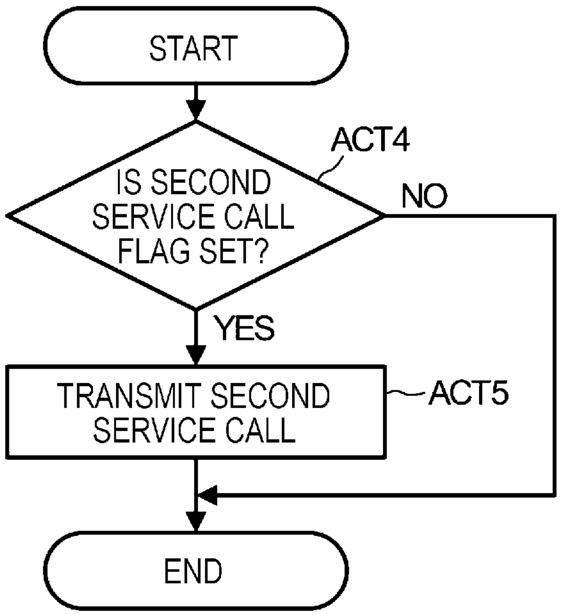
FIG. 14 is a flowchart illustrating an example of a power-off server notification operation by the image forming apparatus according to Modified Example 1.

FIG. 14 is a flowchart illustrating an example of the power-off server notification operation by the image forming apparatus 100. If the power of the image forming apparatus 100 is turned off, the processor 131 is activated by a timer at a specified time such as midnight and executes the processing illustrated in FIG. 14.

In ACT4, the processor 131 determines whether the second service call flag 1343 for any processing unit 41 is set. Based on the determination that the second service call flag 1343 for any processing unit 41 is not set (ACT4, NO), the processor 131 ends the processing of the power-off server notification operation.

Based on the determination that the second service call flag 1343 related to any processing unit 41 is set (ACT4, YES), in ACT5, the processor 131 transmits the second service call to the server device 300 via the communication interface 12. After that, the processor 131 ends the processing of the power-off server notification operation.

In this manner, the processor 131 confirms whether the second service call flag is set at a specified time such as midnight, which is a confirmation timing, that is, confirms in an urgent time. If the flag is set, the processor 131 can request the server device 300 for inspection by a service person in the near future.

Modified Example 2

In addition, instead of the image forming apparatus 100 autonomously transmitting the second service call at such as the midnight during power off, the image forming apparatus 100 may return the second service call in response to an inquiry from the server device 300.

Figure 15:
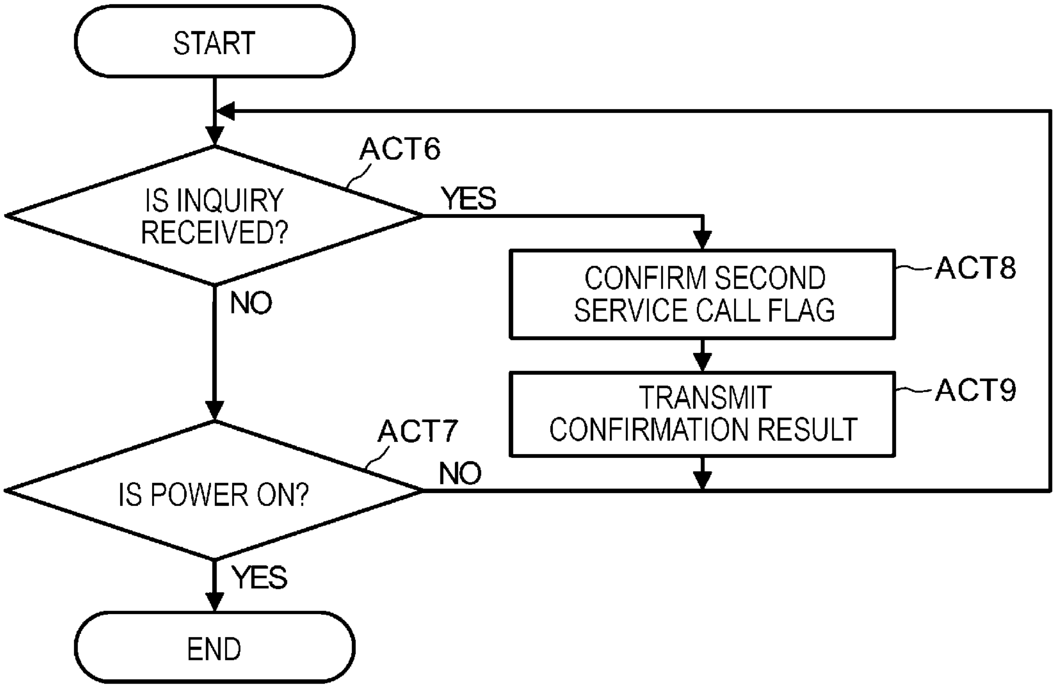
FIG. 15 is a flowchart illustrating an example of a server inquiry response operation by an image forming apparatus according to Modified Example 2 of one embodiment.

FIG. 15 is a flowchart illustrating an example of the server inquiry response operation by the image forming apparatus 100 in this case. If the power switch is operated and the power is turned off, the processor 131 of the image forming apparatus 100 starts the processing illustrated in FIG. 15.

In ACT6, the processor 131 determines whether an inquiry is received from the server device 300 via the communication interface 12.

In response to the determination that no inquiry is received (ACT6, NO), in ACT7, the processor 131 determines whether the power switch is operated to turn on the power. In response to the determination that the power is not turned on (ACT7, NO), the processor 131 proceeds to the processing operation of ACT6 described above. In addition, in response to the determination that the power is turned on (ACT7, YES), the processor 131 ends the server inquiry response operation.

In response to the determination that the inquiry is received (ACT6, YES), in ACT8, the processor 131 confirms the second service call flag 1343.

In ACT9, the processor 131 transmits the confirmation result to the server device 300 via the communication interface 12. After that, the processor 131 proceeds to the processing operation of ACT6. It is noted that the confirmation and the confirmation result may include not only the second service call flag 1343 but also the first service call flag 1342.

Figure 16:
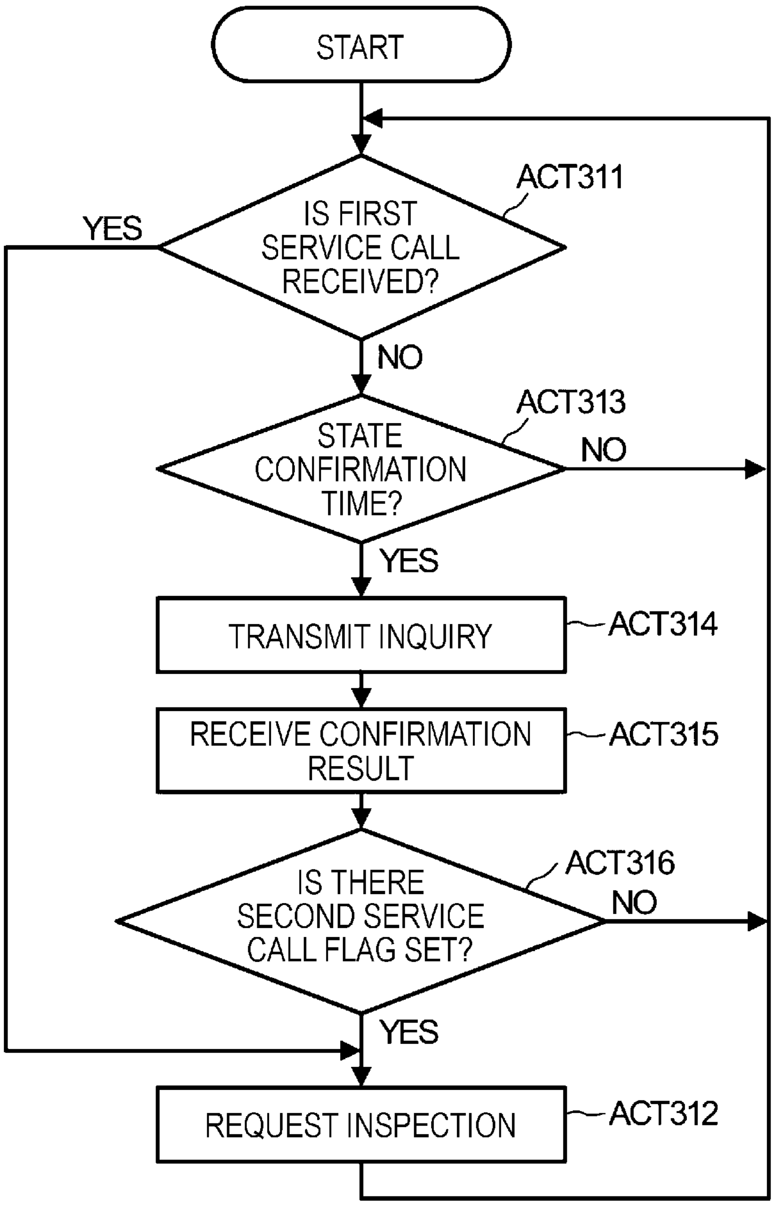
FIG. 16 is a flowchart illustrating an example of an operation of a server device according to Modified Example 2.

FIG. 16 is a flowchart illustrating an example of the operation of the server device 300. If the processor (not illustrated) provided in the server device 300 starts operation due to the power-on, in ACT311, the processor determines whether the first service call is received from any image forming apparatus 100.

In response to the determination that the first service call is received from any image forming apparatus 100 (ACT311, YES), the processor of server device 300 transmits an inspection request based on the service call to service person terminal 400 in ACT312. That is, if the first service call is received, the processor specifies the service person who can handle the image forming apparatus 100 which is the transmission source and requests the service person for urgent inspection.

In response to the determination that the first service call is not been received from any image forming apparatus 100 (ACT311, NO), in ACT313, the processor of the server device 300 determines whether a predetermined state confirmation time such as the midnight which is assumed that most of the image forming apparatuses 100 are not in operation is reached. It is noted that the state confirmation time may be the same time for all the image forming apparatuses 100, or the image forming apparatuses 100 may be divided by every predetermined number of apparatuses such as 10 units. In response to the determination that the state confirmation time is not yet reached (ACT313, NO), the processor of the server device 300 proceeds to the processing operation of ACT311 described above.

In response to the determination that the state confirmation operation is performed (ACT313, YES), in ACT314, the processor of the server device 300 transmits an inquiry to each image forming apparatus 100.

In ACT315, the processor of the server device 300 receives the confirmation result from each image forming apparatus 100.

In ACT316, the processor of the server device 300 determines whether the second service call flag is set to “1” in the received confirmation result. In response to the determination that there is no confirmation result that the second service call flag is set to “1” (ACT316, NO), the processor of the server device 300 proceeds to the processing operation of ACT311.

In response to the determination that the confirmation result that the second service call flag is set to “1” exists (ACT316, YES), the processor of the server device 300 proceeds to ACT312 described above. In ACT312, in this case, the processor specifies the service person who can handle the image forming apparatus 100 of which the second service call flag is set to “1” and requests the service person to perform an inspection in the near future.

It is noted that, although the first service call flag 1342 is used in the embodiment and Modified Examples described above, the first service call flag 1342 may be not used. For example, in response to the determination that the ATC sensor output average value X is reached the range for stopping the machine in the abnormality occurrence prediction operation (ACT19, YES), in ACT25, the processor 131 sets the first service call flag 1342 to “1”. Instead, the processor 131 may immediately transmit the first service call to the server device 300 via the communication interface 12.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, comprising:

a processing component having a developing device using a developer containing two components of toner and carrier;

a sensor configured to output a detection value corresponding to a toner concentration of the developer during operation of the processing component; and a processor configured to determine whether a service call to a service person is necessary based on the detection value of the sensor, operate the processing component at either a high process speed or a low process speed to acquire the detection value of the sensor, before determining whether the service call is necessary;

determine the process speed at which the processing component is to be operated based on the detection value of the sensor; and operate the processing component at the determined process speed to determine whether the service call is necessary.

2. The image forming apparatus according to claim 1, wherein the processor is further configured to, in determining the process speed at which the processing component is to be operated:

determine the high process speed as the process speed at which the processing component is to be operated if the detection value of the sensor detected before determining whether the service call is necessary is equal to or greater than a specified value; and determine the low process speed as the process speed at which the processing component is to be operated if the detection value of the sensor detected before determining whether the service call is necessary is less than the specified value.

3. The image forming apparatus according to claim 2, further comprising a memory configured to store:

a first threshold value corresponding to a first toner concentration for determining that a first service call requesting inspection by the service person with stopping the image forming apparatus is necessary; and a second threshold value corresponding to a second toner concentration for determining that a second service call requesting inspection by the service person without stopping the image forming apparatus is necessary, wherein, in the process of determining whether the service call is necessary, the processor is further configured to compare the detection value of the sensor detected by operating the processing component at the determined process speed with the first threshold value and the second threshold value and determine whether the first and second service calls to the service person are necessary based on the comparison result.

4. The image forming apparatus according to claim 3, wherein the memory is configured to store, as the first threshold values, an upper first threshold value that is larger than the specified value and a lower first threshold value that is smaller than the specified value, and wherein, in determining whether the service call is necessary, the processor is further configured to, if the detection value of the sensor detected by operating the processing component at the determined process speed is either equal to or greater than the upper first threshold value or equal to or less than the lower first threshold value, determine that the first service call requesting inspection by the service person with stopping the image forming apparatus is necessary.

5. The image forming apparatus according to claim 4, wherein the memory is configured to store, as the second threshold values, an upper second threshold value that is larger than the specified value and a lower second threshold value that is smaller than the specified value, and wherein, in determining whether the service call is necessary, the processor is further configured to, if the detection value of the sensor detected by operating the processing component at the determined process speed is either less than the upper first threshold value and equal to or greater than the upper second threshold value, or less than the lower first threshold value and equal to or less than the lower second threshold value, determine that the second service call requesting inspection by the service person without stopping the image forming apparatus is necessary.

6. The image forming apparatus according to claim 5, further comprising a communication interface configured to enable communication with an external device, wherein the processor is further configured to transmit the first or second service call to the external device via the communication interface.

7. The image forming apparatus according to claim 6, wherein the memory is configured to store first and second flags, and wherein the processor is further configured to:

store a value indicating that the first service call is necessary in the first flag when determining that the first service call is necessary; and store a value indicating that the second service call is necessary in the second flag when determining that the second service call is necessary.

8. The image forming apparatus according to claim 7, wherein the processor is further configured to always confirm the first flag and transmit the first service call to the external device by the communication interface if the value indicating that the first service call is necessary is stored in the first flag.

9. The image forming apparatus according to claim 7, wherein the processor is further configured to confirm the second flag in an urgent time and transmit the second service call to the external device by the communication interface if the value indicating that the second service call is necessary is stored in the second flag.

10. The image forming apparatus according to claim 7, wherein the processor is further configured to confirm the second flag at the time of the power off of the image forming apparatus and transmit the second service call to the external device by the communication interface if the value indicating that the second service call is necessary is stored in the second flag.

11. A method for an image forming apparatus, comprising:

outputting a detection value corresponding to a toner concentration of a developer containing two components of toner and carrier during operation of a processing component having a developing device using the developer;

determining whether a service call to a service person is necessary based on the detection value;

operating the processing component at either a high process speed or a low process speed to acquire the detection value, before determining whether the service call is necessary;

determining the process speed at which the processing component is to be operated based on the detection value; and operating the processing component at the determined process speed to determine whether the service call is necessary.

12. The method according to claim 11, in determining the process speed at which the processing component is to be operated, further comprising:

determining the high process speed as the process speed at which the processing component is to be operated if the detection value detected before determining whether the service call is necessary is equal to or greater than a specified value; and determining the low process speed as the process speed at which the processing component is to be operated if the detection value detected before determining whether the service call is necessary is less than the specified value.

13. The method according to claim 12, further comprising:

storing a first threshold value corresponding to a first toner concentration for determining that a first service call requesting inspection by the service person with stopping the image forming apparatus is necessary;

storing a second threshold value corresponding to a second toner concentration for determining that a second service call requesting inspection by the service person without stopping the image forming apparatus is necessary; and in the process of determining whether the service call is necessary, comparing the detection value detected by operating the processing component at the determined process speed with the first threshold value and the second threshold value and determining whether the first and second service calls to the service person are necessary based on the comparing.

14. The method according to claim 13, further comprising:

storing, as the first threshold values, an upper first threshold value that is larger than the specified value and a lower first threshold value that is smaller than the specified value; and in determining whether the service call is necessary, if the detection value detected by operating the processing component at the determined process speed is either equal to or greater than the upper first threshold value or equal to or less than the lower first threshold value, determining that the first service call requesting inspection by the service person with stopping the image forming apparatus is necessary.

15. The method according to claim 14, further comprising:

storing, as the second threshold values, an upper second threshold value that is larger than the specified value and a lower second threshold value that is smaller than the specified value; and in determining whether the service call is necessary, if the detection value detected by operating the processing component at the determined process speed is either less than the upper first threshold value and equal to or greater than the upper second threshold value, or less than the lower first threshold value and equal to or less than the lower second threshold value, determining that the second service call requesting inspection by the service person without stopping the image forming apparatus is necessary.

16. The method according to claim 15, further comprising:

transmitting the first or second service call to an external device via a communication interface.

17. The method according to claim 16, further comprising:

storing first and second flags;

storing a value indicating that the first service call is necessary in the first flag when determining that the first service call is necessary; and storing a value indicating that the second service call is necessary in the second flag when determining that the second service call is necessary.

18. The method according to claim 17, further comprising:

always confirming the first flag and transmitting the first service call to the external device by the communication interface if the value indicating that the first service call is necessary is stored in the first flag.

19. The method according to claim 17, further comprising:

confirming the second flag in an urgent time and transmitting the second service call to the external device by the communication interface if the value indicating that the second service call is necessary is stored in the second flag.

20. The method according to claim 17, further comprising:

confirming the second flag at the time of the power off of the image forming apparatus and transmitting the second service call to the external device by the communication interface if the value indicating that the second service call is necessary is stored in the second flag.

* * * * *